(12) United States Patent
Carlson

(10) Patent No.: US 10,194,670 B2
(45) Date of Patent: Feb. 5, 2019

(54) METHOD AND APPARATUS FOR DESHELLING SHELLFISH

(71) Applicant: Eric Carlson, Scarborough, ME (US)

(72) Inventor: Eric Carlson, Scarborough, ME (US)

( * ) Notice: Subject to any disclaimer, the term of this patent is extended or adjusted under 35 U.S.C. 154(b) by 0 days.

(21) Appl. No.: 15/963,367

(22) Filed: Apr. 26, 2018

(65) Prior Publication Data

US 2018/0242602 A1     Aug. 30, 2018

Related U.S. Application Data

(63) Continuation-in-part of application No. 14/917,038, filed on Mar. 7, 2016, now Pat. No. 10,021,886.

(51) Int. Cl.
*A22C 29/00* (2006.01)
*A22C 29/02* (2006.01)
*B23K 26/38* (2014.01)
*B65G 17/46* (2006.01)

(52) U.S. Cl.
CPC .......... *A22C 29/025* (2013.01); *A22C 29/021* (2013.01); *A22C 29/023* (2013.01); *B23K 26/38* (2013.01); *B65G 17/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,324,228 A * | 6/1994 | Vogeley, Jr. | ....... | A22C 17/0086 452/150 |
| 5,334,084 A * | 8/1994 | O'Brien | ............... | A22B 5/0005 452/134 |
| RE36,664 E * | 4/2000 | O'Brien | ............... | A22B 5/0005 452/149 |
| 6,563,904 B2 * | 5/2003 | Wijts | ....................... | A22B 5/00 378/54 |
| 7,285,040 B2 * | 10/2007 | Ilch | ....................... | A22B 5/0029 452/150 |
| 7,404,759 B2 * | 7/2008 | Sato | ....................... | A22B 5/0041 452/157 |
| 7,452,266 B2 * | 11/2008 | Bottemiller | ............... | A22C 7/00 452/150 |
| 7,857,686 B2 * | 12/2010 | Arnason | ............... | A22C 25/166 452/161 |
| 8,753,179 B2 * | 6/2014 | Rusko | ....................... | A22C 25/18 452/150 |
| 8,981,897 B2 * | 3/2015 | Alsafar | ............... | A22C 17/0006 219/121.58 |
| 8,986,080 B2 * | 3/2015 | Black | ....................... | A22B 5/166 452/150 |

* cited by examiner

*Primary Examiner* — Richard T Price, Jr.
(74) *Attorney, Agent, or Firm* — Jeffrey Joyce, Esq.

(57) ABSTRACT

A method and apparatus for deshelling shellfish, particularly lobsters, using a laser cutting system.

13 Claims, 17 Drawing Sheets

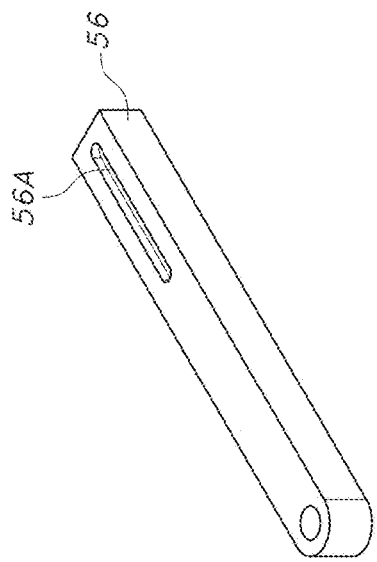
FIG. 18
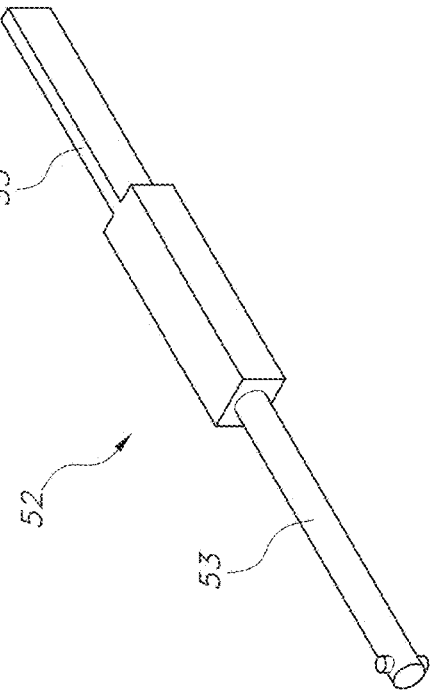
FIG. 20
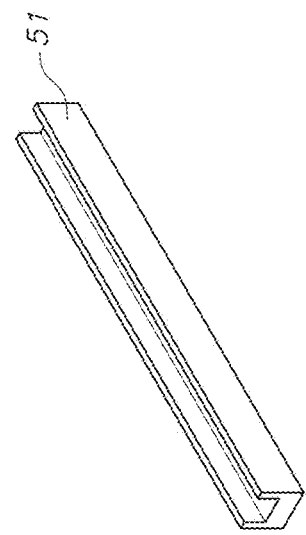
FIG. 17
FIG. 19

METHOD AND APPARATUS FOR DESHELLING SHELLFISH

BACKGROUND INFORMATION

Field of the Invention

The invention relates to a process for deshelling shellfish, particularly lobsters.

Discussion of Prior Art

The act of processing lobster meat is an inherently tedious process. The bulk of the editable meat that is found within a lobster is in the claws, knuckles, and tail, constituting a total of seven different pieces, each of which presents its own challenges for picking. Due to the inherent challenges, deshelling lobsters and picking the meat for food preparation has always been a process that requires a significant amount of manual labor, which increases the costs of production and the time that it takes to generate large quantities of prepared meat.

What is needed, therefore, is an automated process of removing lobster meat from the lobsters shell.

BRIEF SUMMARY OF THE INVENTION

The invention is an automated process for deshelling and removing meat from shellfish, and in particular, lobster, and the apparatus therefor. The process starts by sanitizing the lobster. The lobster is then butchered to sever the tail, the knuckles, and claws from the lobster body. The severed body parts are then cut along the shell, and the meat is then extracted and packaged. The apparatus includes a steam station, butchering station, cutting station, extraction station, batching station, and retort station.

The steam station uses high temperature short time pasteurization or high pressure pasteurization to sanitize the shells and meat, and also causes the meat to separate from the shell. A conveyor belt brings the sanitized lobster to the butchering station, which uses a vision system to capture the location and dimensions of the lobster on the belt. One or more vision-guided robots then pick up the lobster by the body and then uses a number of butchering blocks to sever the tail, claws, knuckles and legs from the main part of the lobster body.

Those severed parts are then sent to the cutting station, where the shell of each part is cut. Those cut shells are then conveyed through the extraction station, where another vision system captures the location and dimensions of the cut part, and additional vision-guided robots extract the meat and discard the shells. The extracted meat is then sent on to the packaging station, where it is packaged, and then to a retort station, which prepares the package for transport and sale by cooking the meat in the sealed package and then chilling the package to preserve the final product.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 17 is a perspective view of a portion of the grip track.

FIG. 18 is a perspective view of the cam slide.

FIG. 19 is a perspective view of the nose spring.

FIG. 20 is a perspective view of the nose slide.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
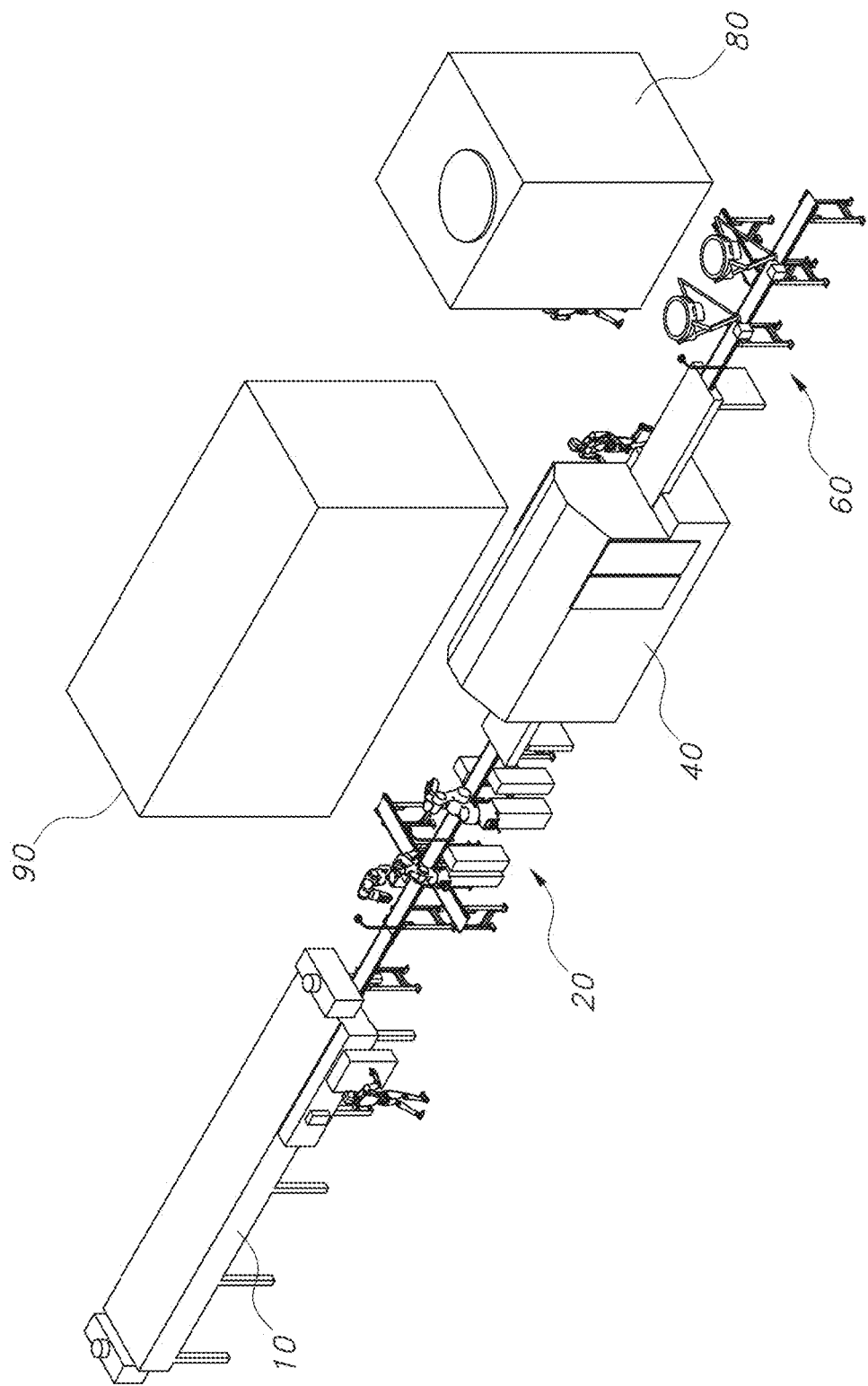
FIG. 1 is a perspective view of the lobster deshelling processing line according to the invention.
Figure 2:
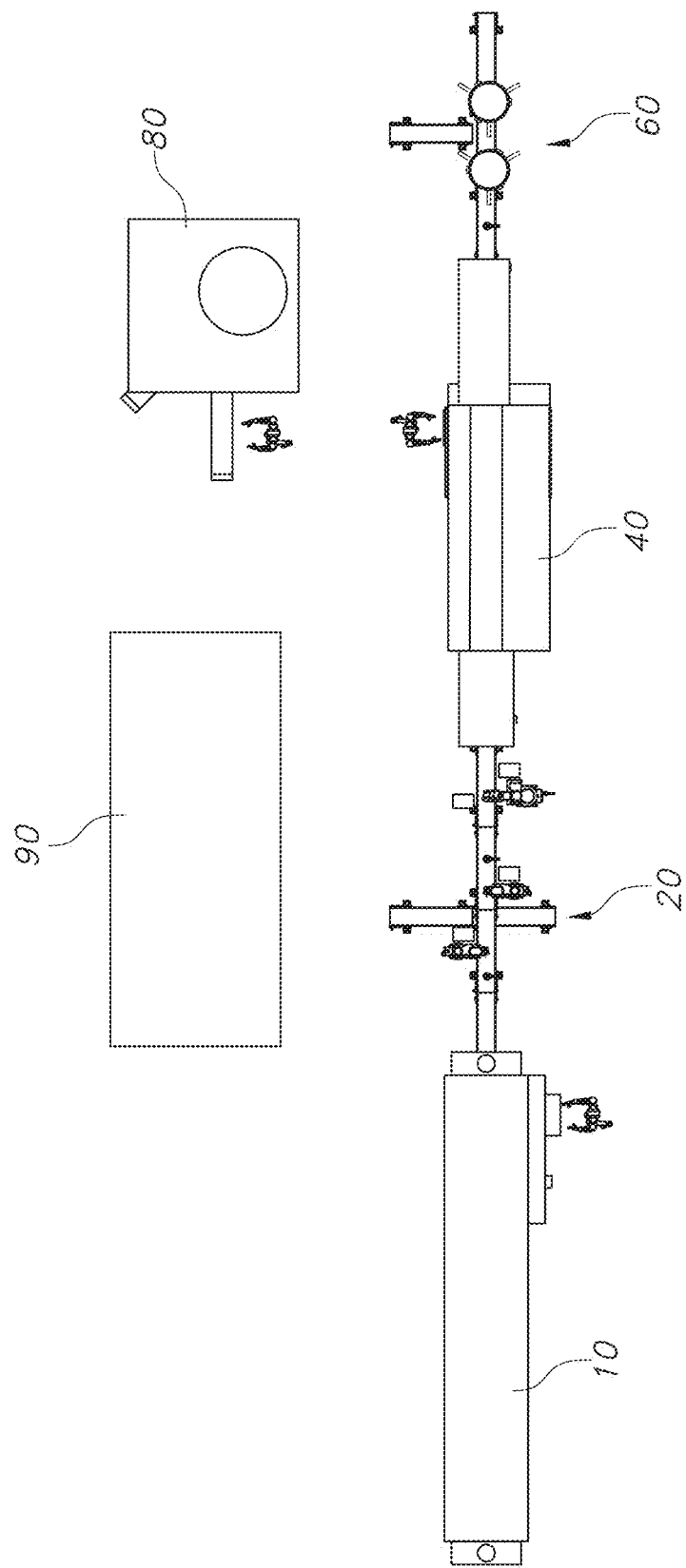
FIG. 2 is a plan view of the processing line.

FIGS. 1 and 2 illustrate an automated processing line 100 for deshelling shellfish, and in particular, for deshelling lobster. The processing line 100 comprises a steam station 10, a butchering station 20, a cutting station 40, an extraction station 60, a batching station 80, and a retort station 90. The general process is as follows: lobsters are sent through the steam station 10 where they are sanitized. Preferably, the lobsters are already dead. The lobsters then pass through the butchering station 20 where the tails, claws, knuckles, and legs are separated from the lobster's body. The separated parts are then sent through a cutting station 40 where the shells are cut. The cut lobster parts exit the cutting station 40 and pass through the extraction station 60, where the meat is extracted. The meat may then be sent to a batching station 80, where is it packaged, and then on to a retort station 90 where the packaged product is cooked, then chilled, and made ready for transport and sale.

The steam station 10, illustrated in FIGS. 1 and 2, is constructed in this embodiment as a tunnel in which high temperature short time pasteurization takes place, which is a well-known method of heat pasteurization. High pressure pasteurization is also a suitable process of pasteurization. As the lobster passes through the steam station 10, the pasteurization process sterilizes the outside of the shell and the surface of the meat inside the shell, and causes the meat to detach from the shell. This process does not cook the meat and primarily serves to sanitize the lobster prior to the shell being cracked and the meat removed.

FIGS. 1-7 illustrate the butchering station 20, which includes a first conveyor belt 21, a first vision system 22, one or more butchering robots 24, and one or more breaking blocks 25. The sterilized lobster exits the steam station 10 and enters the butchering station 20 via the conveyor belt 21 and passes under the first vision system 22, which captures the lobster's dimensions. Many conventional vision systems may be suitable for this task, such as, for example, the IN-SIGHT vision system sold by Cognex Corporation. Once the vision system 22 has captured the location and dimensions of the lobster, the information is relayed to one or more of the butchering robots 24. The butchering robots 24 are vision-guided robotic systems, such as, for example, six-axis vision-guided robots such as the MOTOMAN GP8. Each individual robot 24 is capable of butchering a single lobster, and multiple robots 24 may be used to process a larger quantity of lobster.

Using the information from the vision system 22, the butchering robot 24 grips the lobster at the center of its body. It then puts the lobster into a suitable one of the breaking blocks 25, which are secured to a work station 26, and twists the body to sever the body part. The embodiment of the processing line 100 that is adapted to deshell lobster, for example, includes three different breaking blocks, a tail breaking block 25A shown in FIG. 6, a knuckle breaking block 25B shown in FIG. 7, and a claw breaking block (not shown). Each breaking block 25 includes an insertion opening 32 and a grip wedge 34. The butchering robot 24 recognizes which body part, tail, knuckle, or claw, is to be cracked and moves the appropriate body part into the insertion opening 32 of the appropriate breaking block 25, wedges the part into grip wedge 34, and then rotates the body to sever the body part. The severed part is then placed back on the conveyor 21 and sent to the cutting station 40. An exit conveyor 28 may also be provided to provide for separate sorting of certain body parts, such as the tail, which may have value as an in-shell product. It is understood, that, depending on the particular type of shell fish that is to be shelled with the processing line 100 according to the invention, other types of breaking blocks may be used and that the scope of this invention is not limited to the types of breaking blocks shown in the figures.

Figure 9:
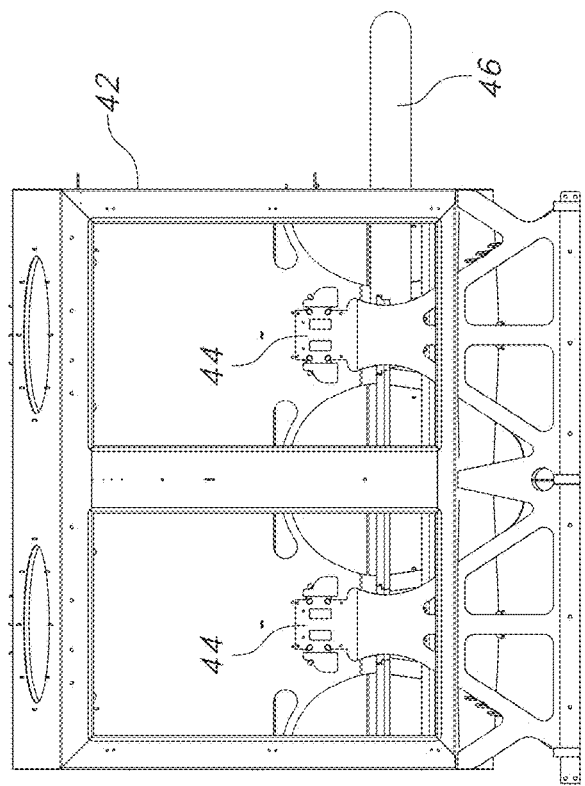
FIG. 9 is a side view of the cutting chamber.
Figure 8:
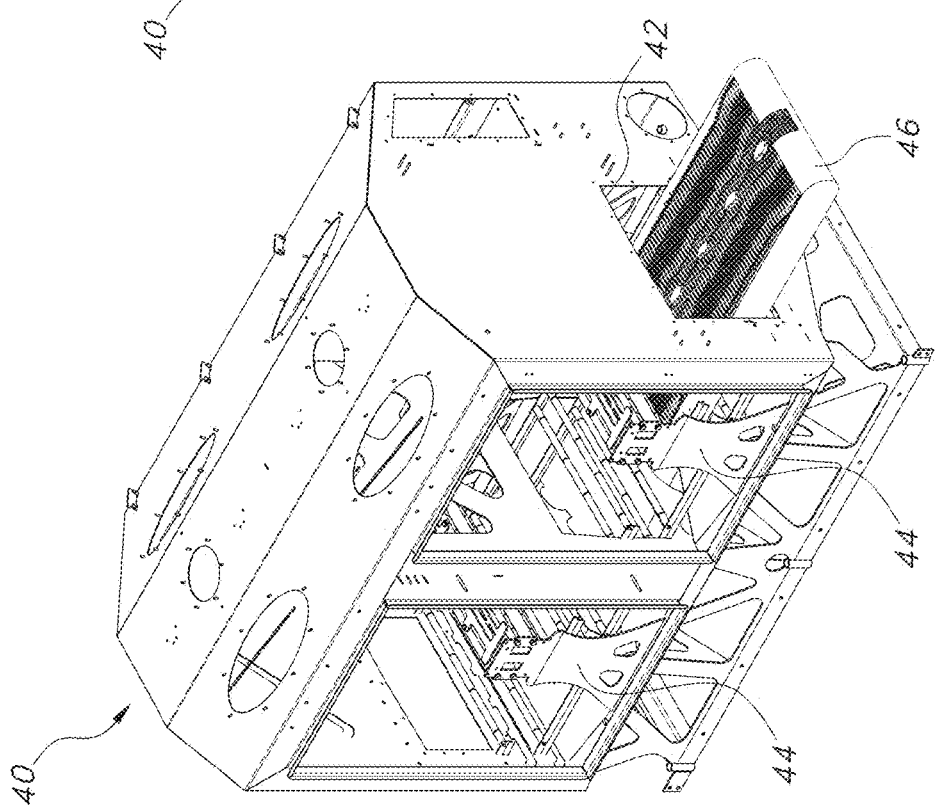
FIG. 8 is a perspective view of the cutting chamber.
Figure 10:
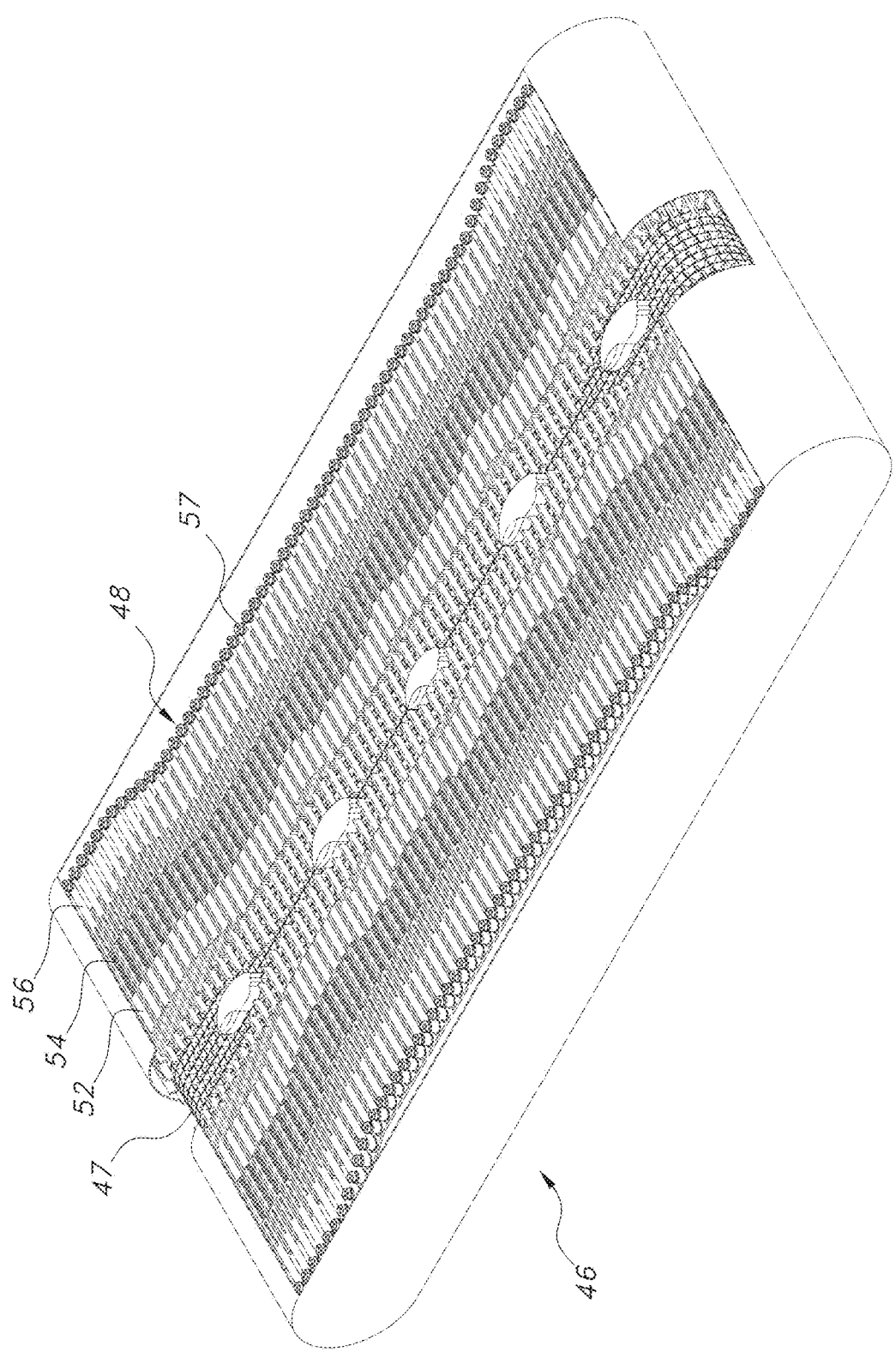
FIG. 10 is a perspective view of the gripper conveyor.
Figure 11:
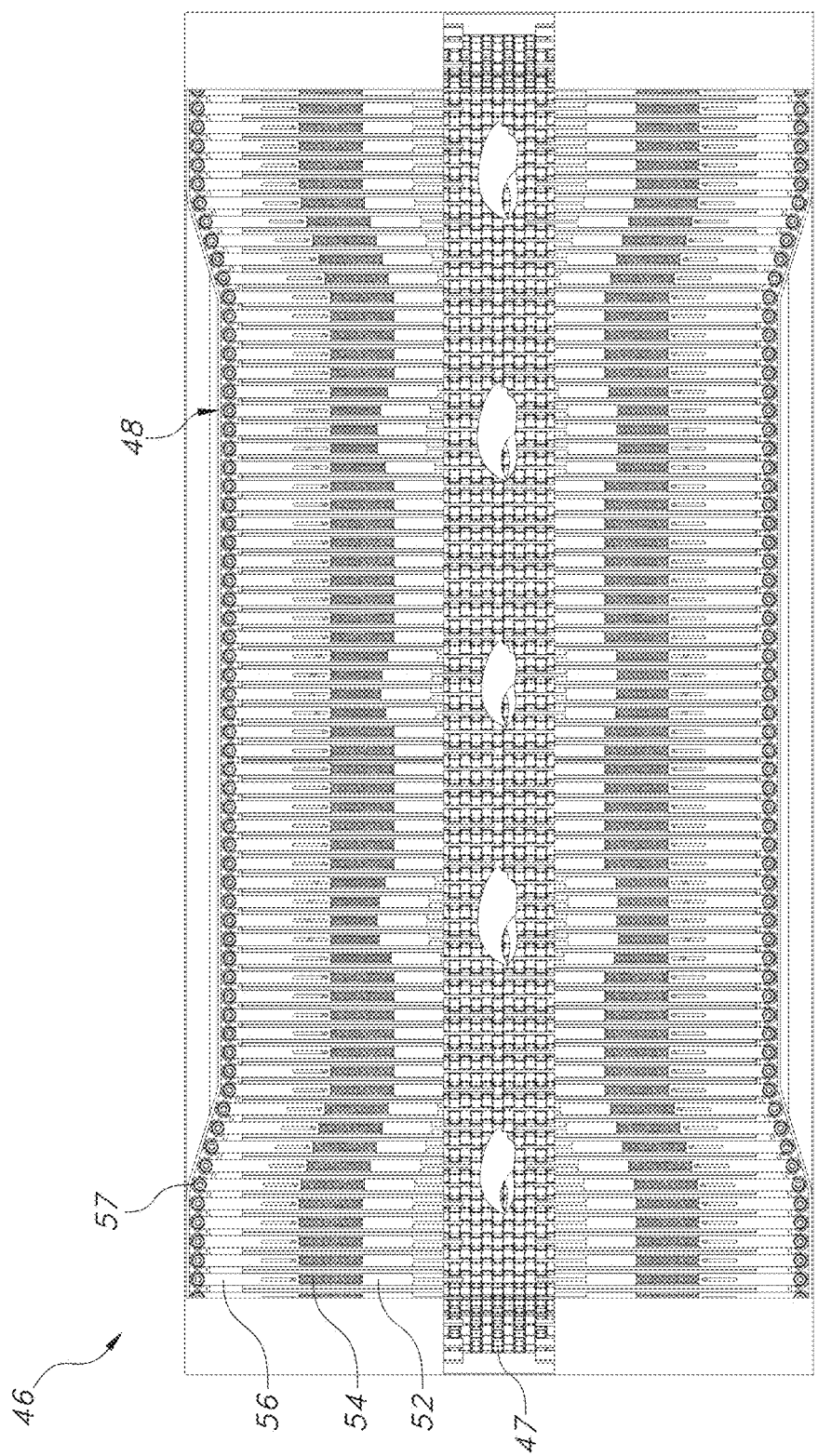
FIG. 11 is a top view of the gripper conveyor.

FIGS. 8 and 9 illustrate the first embodiment of the cutting station 40, which includes a second vision system 42, a cutting instrument 44 that is a plurality of water knives 44, and a second conveyor 46, referred to hereinafter as a gripping conveyor 46. The body part is moved onto the gripping conveyor 46 from the conveyor belt 21, where it is securely gripped and brought into the cutting station 40, which, in this embodiment, is constructed as a tunnel. As the body part approaches the entrance to the cutting station 40, the second vision system 42 creates an image of the body part, identifies the part, captures its precise dimensions and position on the gripping conveyor 46, and then calculates a desired cut pattern to remove the shell. For example, the shell on the claw may be cut around the outer edge, whereas the shell on the knuckle may be cut on both ends. Once the cut pattern is determined, the water knife 44 cuts the shell accordingly.

FIGS. 10-12 and 17-20 illustrate the gripping conveyor 46, which has been specially constructed for processing lobster meat, and is particularly useful when cutting shells with the water knives 44 of the first embodiment of the cutting station 40. The gripping conveyor 46 includes a conveyor belt 47, cam tracks 48, and a plurality of grip bars 49 that extend across the width of the gripping conveyor 46. Affixed to the conveyor belt 47 are a plurality of grip tracks 51, which extend out from the belt 47 toward the cam tracks 48. The grip tracks 51 are formed as a shallow channel, having a bottom and two short sides that extend upward to form the channel and inner ends of the grip bars 49 are captured in the channels. The grip bar 49 is a spring loaded bar comprising a nose slide 52, a nose spring 54, and a cam slide 56, and that is coupled to a wheel 57 placed in the cam track 48. The nose slide 52 has a first end 53 that extends through the nose spring 54 and is coupled to the cam slide 56 and a second end 55 that is in contact with the severed lobster part. The first end 53 of the nose slide has a knob or protrusion that is slidably captured in a groove 56A on one end of the cam slide 56; the wheel 57 is attached to the other end of the cam slide 56. As the conveyor belt 47 moves, the grip tracks 51 move the grip bars 49 along the cam tracks 48.

The cam tracks 48 are wider at the entry and exit ends of the cutting station 40 to allow the severed lobster part to enter and exit the gripping conveyor 46 without interference from the grip bars 49. Inside the cutting station, the distance between the cam tracks 48 narrows which causes the grip bars 49 to slide toward the center of the conveyor belt 47 in the grip tracks 51 and to close in on the severed lobster part. The nose springs 54 cause the grip bars 49 to apply compression to the lobster part, holding it in place on the conveyor 47. The number and spacing of the grip bars is such, that multiple grip bars 49 are in contact with each severed lobster part.

Figure 13:
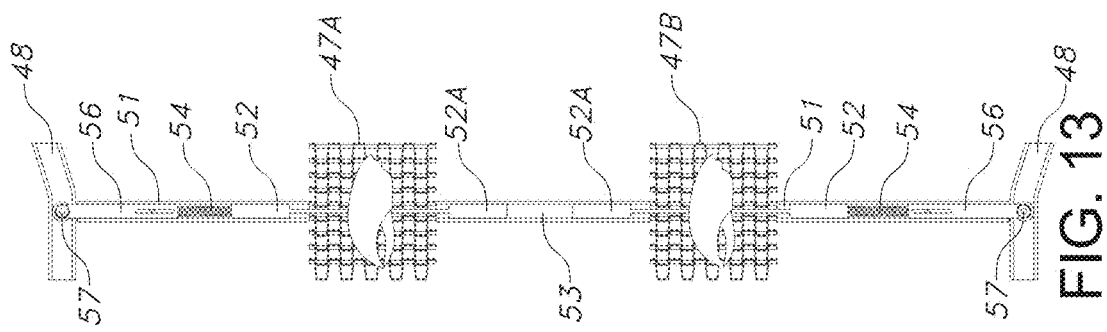
FIG. 13 is a top view of a double gripper.
Figure 12:
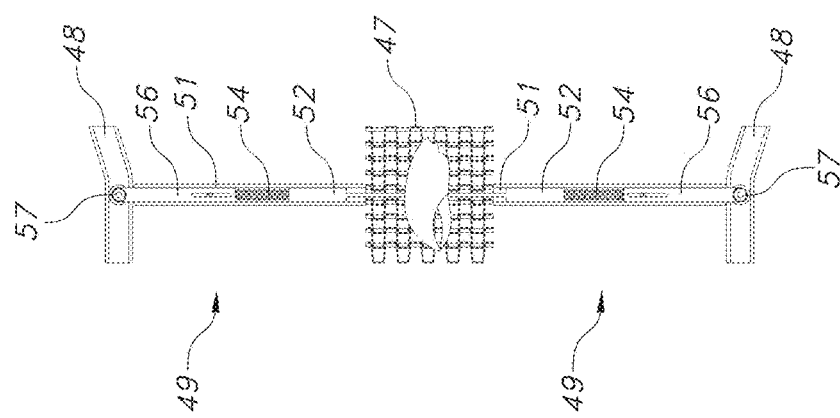
FIG. 12 is a top view of a single gripper.

FIG. 13 illustrates a second embodiment of the gripping conveyor 46 that includes two conveyor belts 47A, 47B, which are separated by a link 59. Nose slides 52A are affixed in the link 59 and support one side of the severed lobster part. Grip bars 49 as described in the first embodiment secure the severed part in place by applying pressure to the side of the body part opposite the nose slides 52A.

Figure 21:
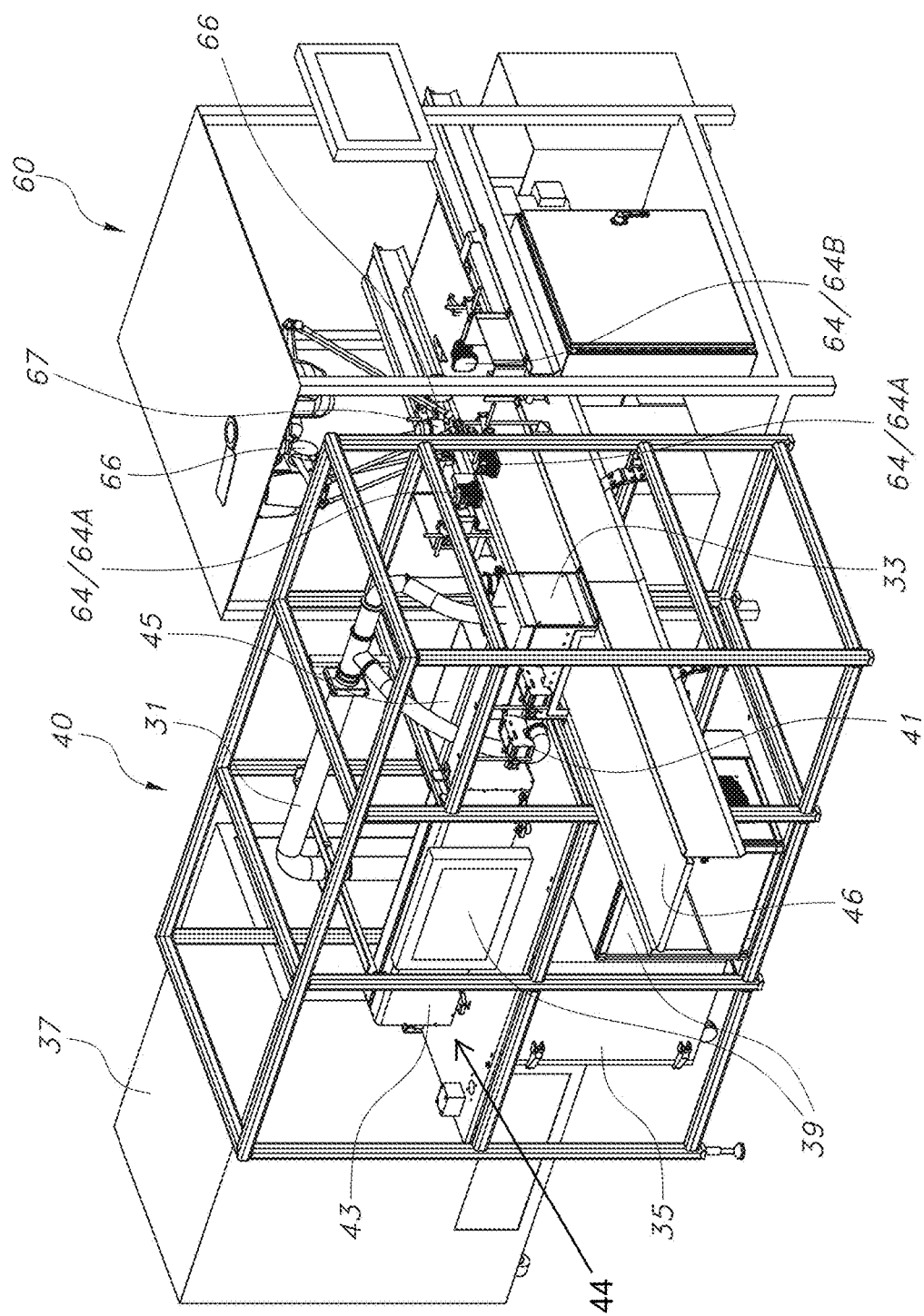
FIG. 21 is a side cross-sectional view showing the second embodiment of the cutting station.
Figure 22:
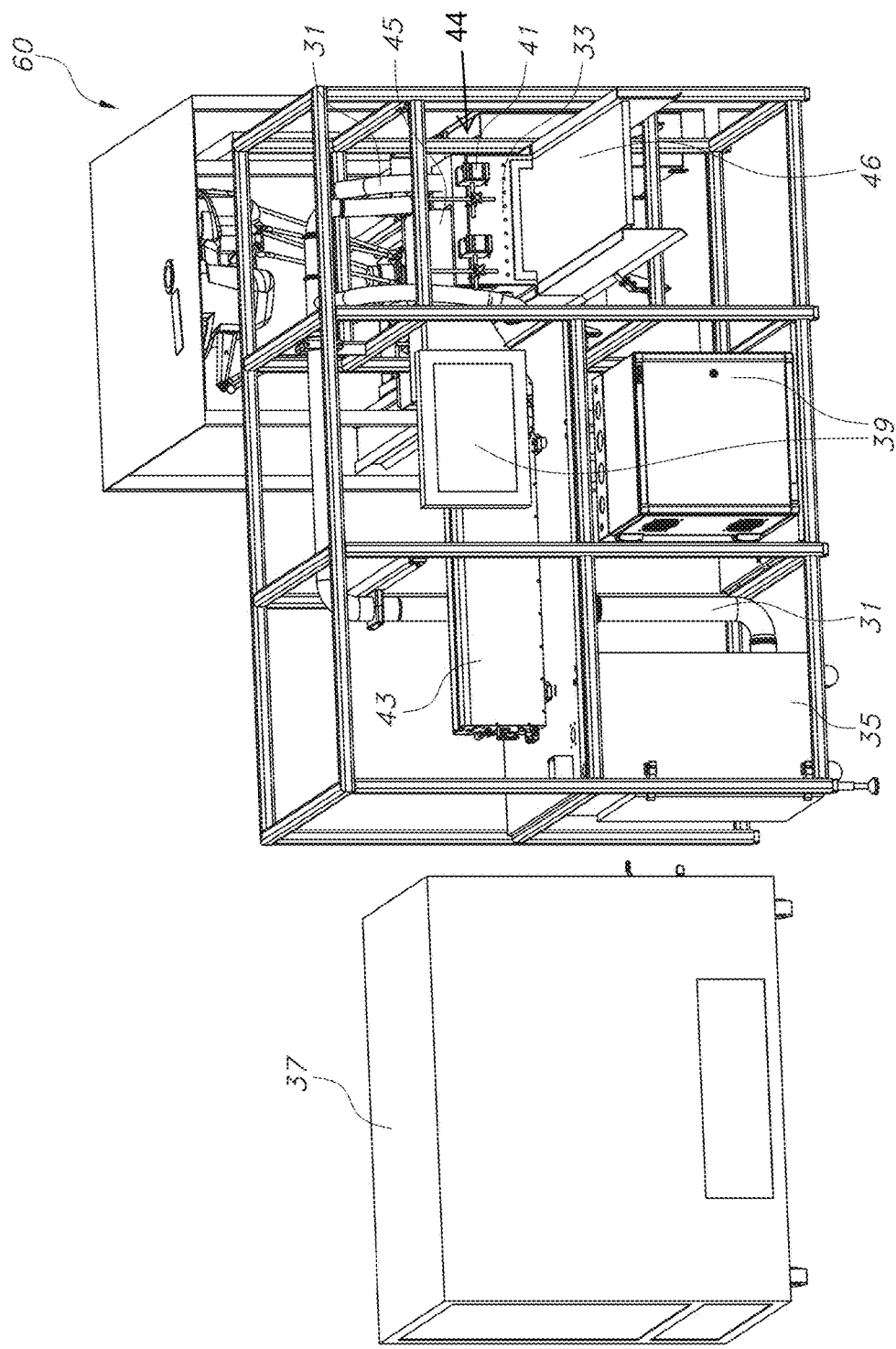
FIG. 22 is a front view of the second embodiment of the cutting station.

FIGS. 21 and 22 illustrate a second embodiment of the cutting station 40. In this embodiment, the cutting instrument 44 is a laser cutting system that includes a scanner 41, a laser 43, a laser beam control device 45, and a controller 39. The second conveyor 46 in this embodiment may be a conventional conveyor rather than the gripping conveyor that is used with the first embodiment of the cutting station 40, or the second conveyor 46 may also simply be a continuation of the first conveyor belt 21 rather than a separate conveyor.

The scanner 41 is a laser measurement sensor that is capable of capturing a 3-dimensional ("3D") image data of the body part on the second conveyor 46, the image data including the position of the body part on the second conveyor 46 as well as the measurements and dimensions of the body part. Many sensors are capable of capturing such image data, such as the LJ-V7000 Series sensor heads that are manufactured by KEYENCE.

The laser 43 is conventional laser that emits a laser beam that is capable of cutting through a shellfish shell, preferably a carbon dioxide laser ($CO_2$ laser) having approximately a 10 micron wavelength, and preferably having continuous wave power of approximately 400 watts. There are a number of suitable $CO_2$ lasers that are commercially available, such as the PULSTAR and/or FIRESTAR series lasers made by SYNRAD.

The laser beam control device 45 is a device that is able to guide the laser beam in a certain pattern, in this instance to guide the laser beam around a portion of the body part so as to cut the shell for meat extraction. For example, the laser beam control device 45 may be a 3-axis mirror galvanometer such as the Lightning II or ProSeries 2 galvanometer made by CAMBRIDGE TECHNOLOGY, which is positioned at the head of the laser 43 and above the second conveyor 46.

The controller 39 is a programmable computer, such as the LJ-V7001 from KEYENCE, that is programmed using conventional programming techniques, and is connected to the scanner 41, laser 43 and the laser beam control device 45, also using conventional means. The controller 39 is preprogramed with the speed of the second conveyor 46, and with its connections to the scanner 41, laser 43 and laser beam control device 45 it is able to receive image data from the scanner 41 and use that image data to activate the laser 43 at the proper time and along the proper path in order to cut the shell on the body part.

More specifically, the scanner 41 scans the body part as it moves along the second conveyor 46 and under the scanner 41 and captures the position of the body part on the second conveyor 46 as well as the size and dimensions of the body part, and relays that size and position data to the controller 39. Using the size and position data the controller 39 creates a cut pattern that is comprised of linked direction vectors. The linked direction vectors, or vector data, are sent to the laser beam control device 45, which uses the vector data to direct the laser's 43 beam around the cut pattern. Using the known speed of the conveyor along with the position of the body part on the conveyor the controller 39 is programmed using conventional techniques to activate the laser 41 at the proper moment to cut the body part along the cut pattern as it is moving along the second conveyor 46.

The embodiment shown includes one conveyor 46 and one laser 43, however, more conveyors and lasers may be used depending on the scale of the processing line 100. For example, the cutting station 40 may have four conveyors that run in parallel to one another, with one scanner, one laser, and one laser control device provided for each conveyor so as to cut the shells on a higher volume of lobsters at the same time and with the same processing line 100. One or more controllers may be utilized as needed depending on the scale of the processing line 100.

A fume extractor 35, such as the FUMEX FA5 fume extractor, and cooling system 37, such as the OPTI TEMPOTC 2.0 Air Cooled Chiller, may also be provided to control the environment surrounding the cutting station 40. A protective viewing box 33 is provided to confine the laser beam so as to capture the fumes and to prevent individuals from accidently contacting the laser beam. Conventional tubing 31 conveys any fumes to the fume extractor 35.

Figure 3:
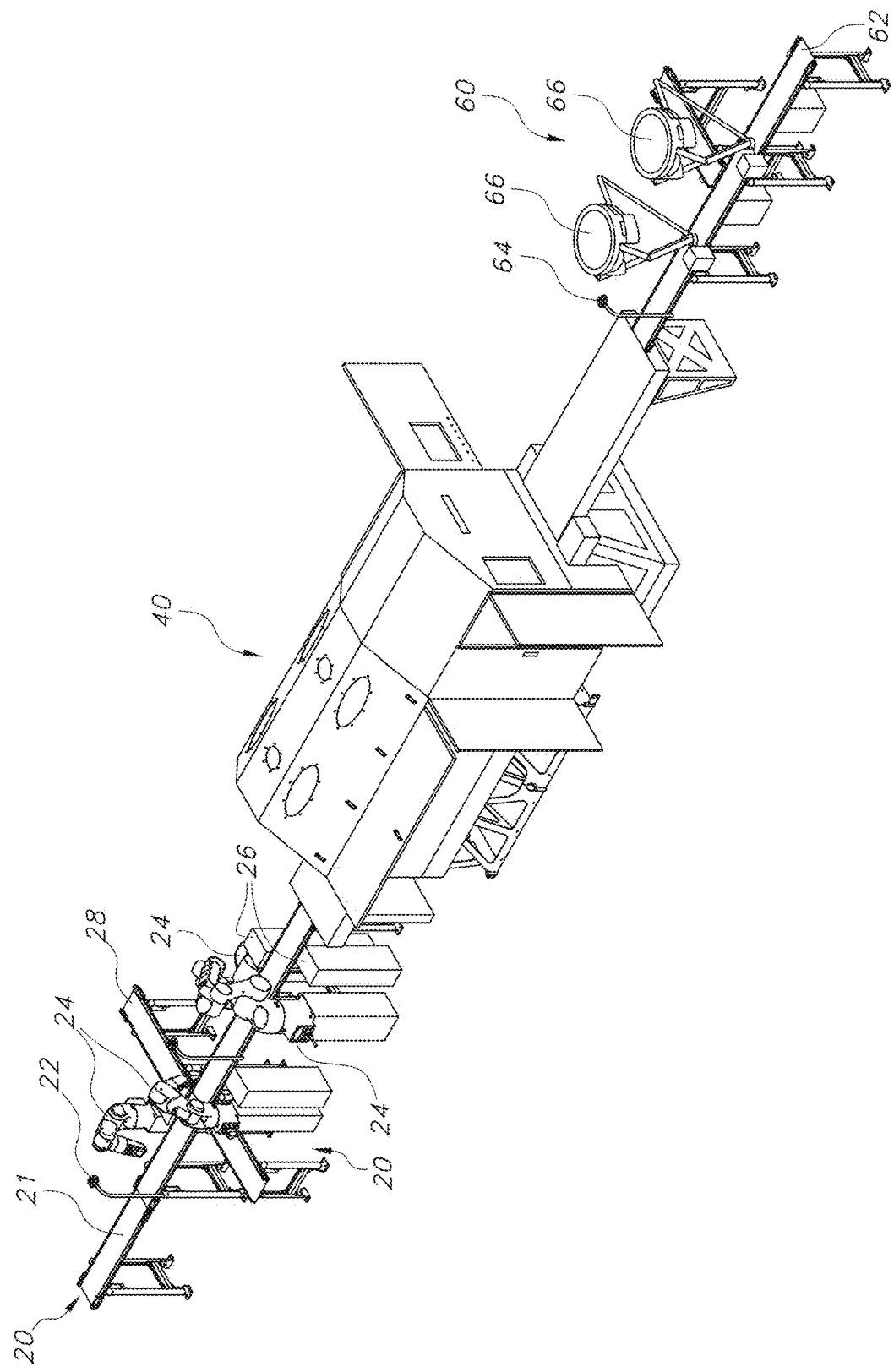
FIG. 3 is a perspective view of the processing line.
Figure 4:
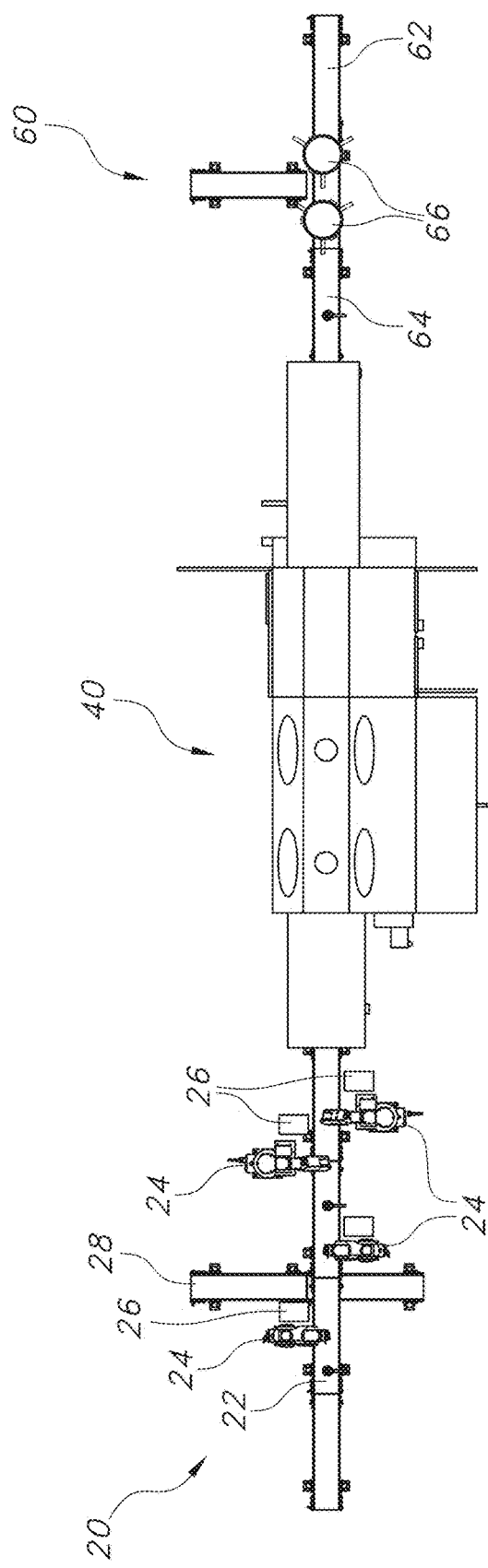
FIG. 4 is a top view of the equipment shown in FIG. 3.
Figure 5:
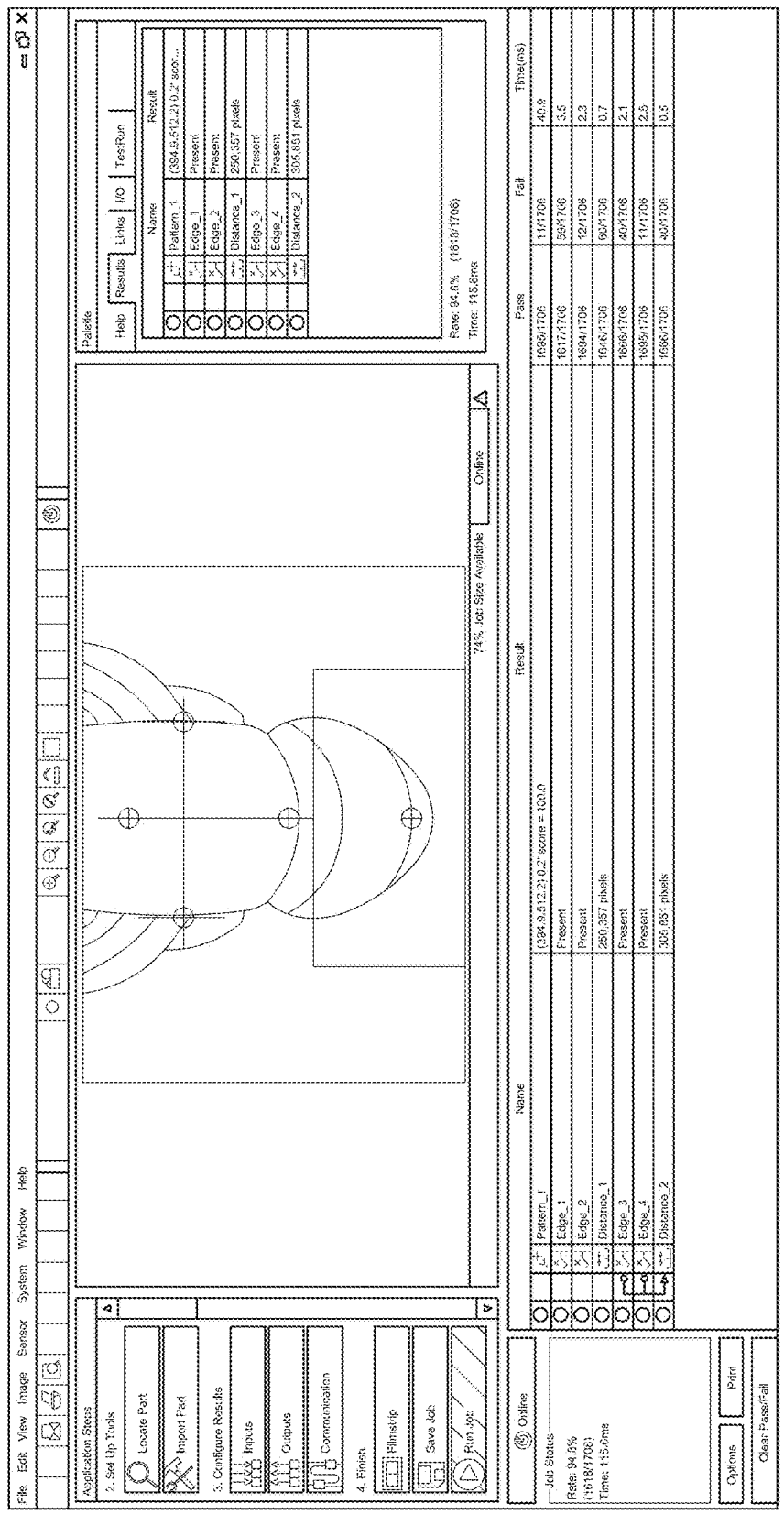
FIG. 5 is a view of the vision system capturing the dimensions of a lobster.
Figure 7:
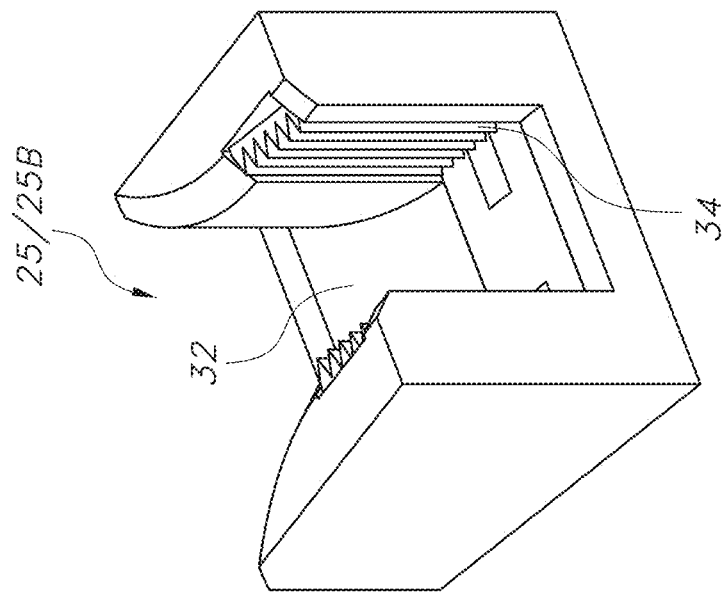
FIG. 7 is a perspective view of a breaking block.
Figure 6:
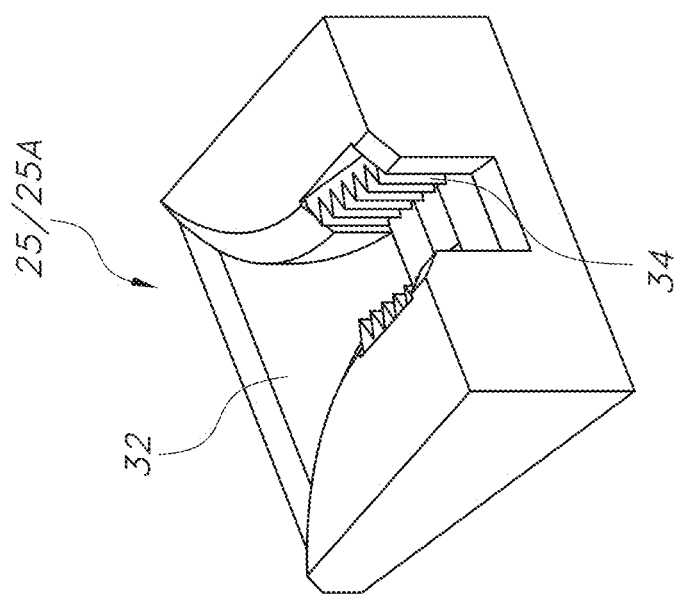
FIG. 6 is a perspective view of a breaking block.
Figure 14:
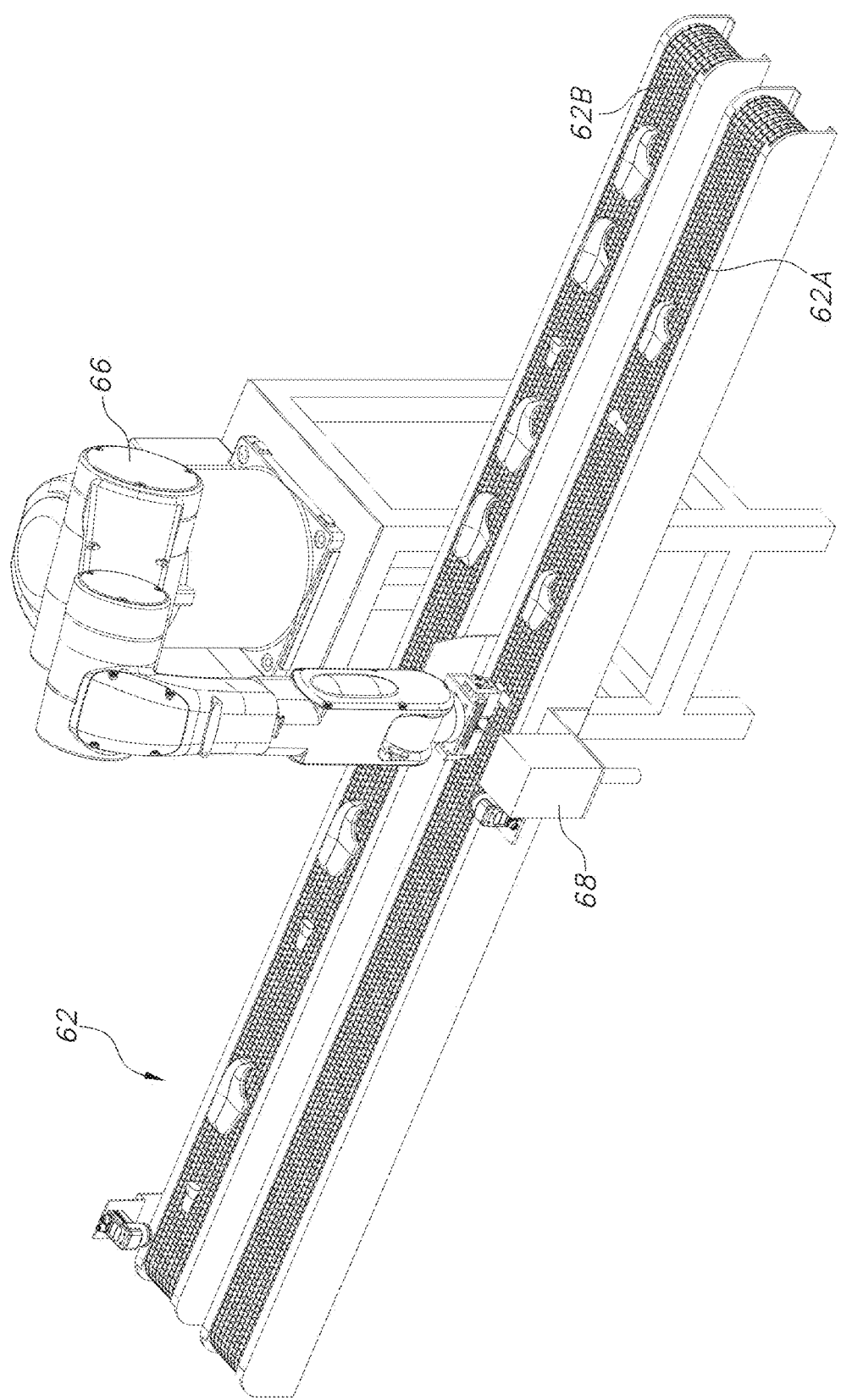
FIG. 14 is a perspective view of a meat extraction station.
Figure 15:
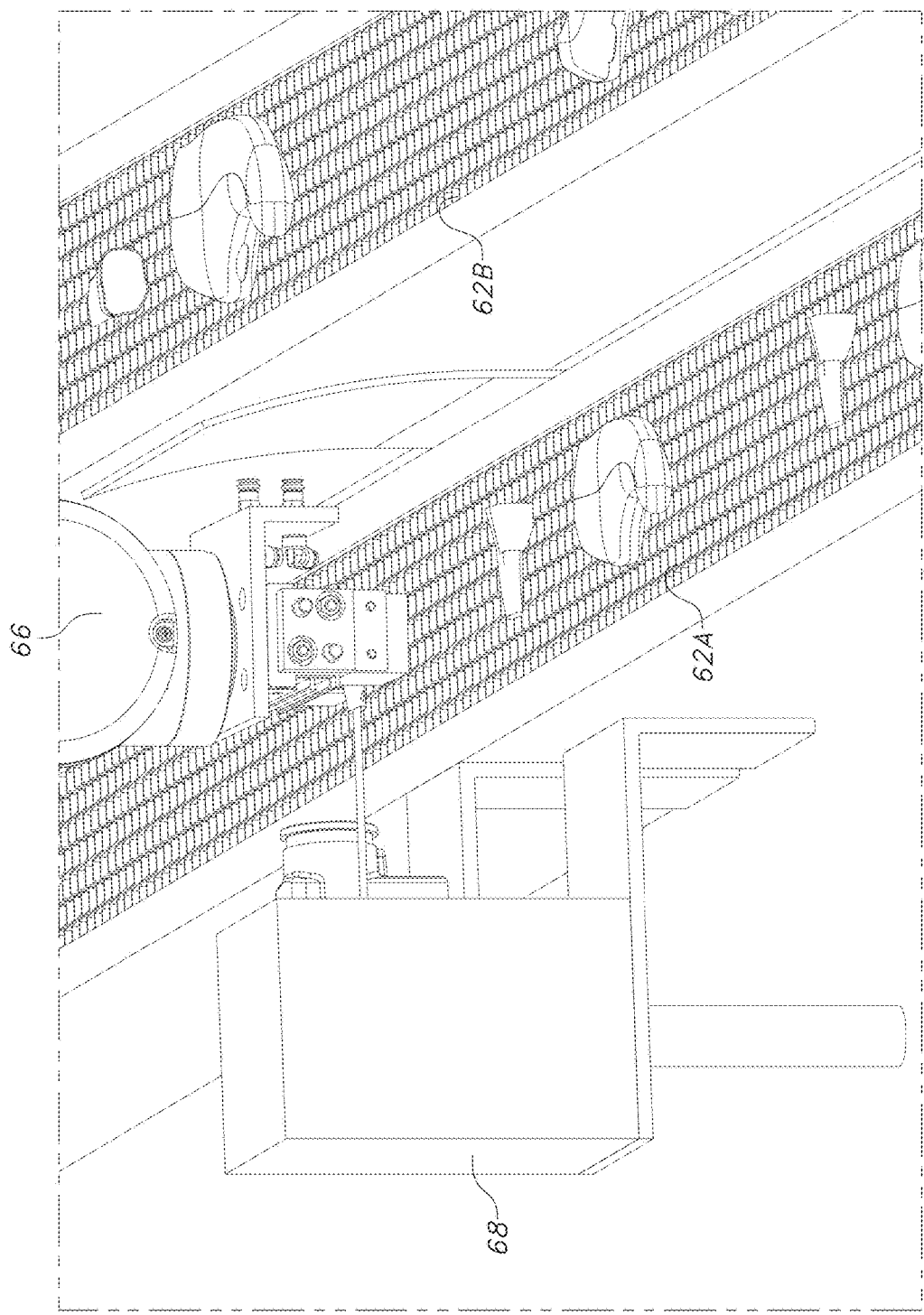
FIG. 15 is a perspective view of the meat extraction station, showing the head of the robot and the blower.
Figure 16:
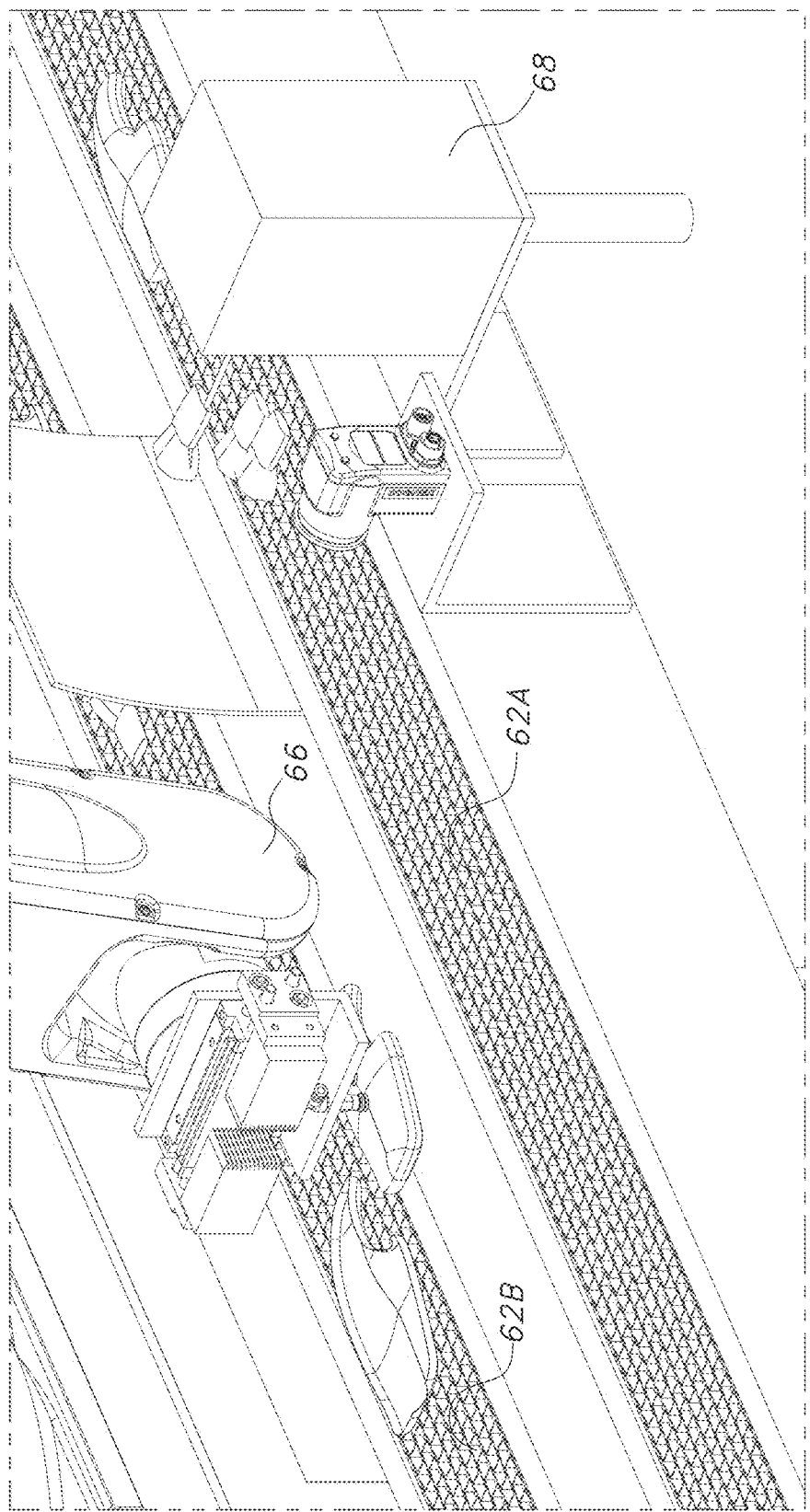
FIG. 16 is a perspective view of the meat extraction station showing the head of the robot and the blower.
Figure 23:
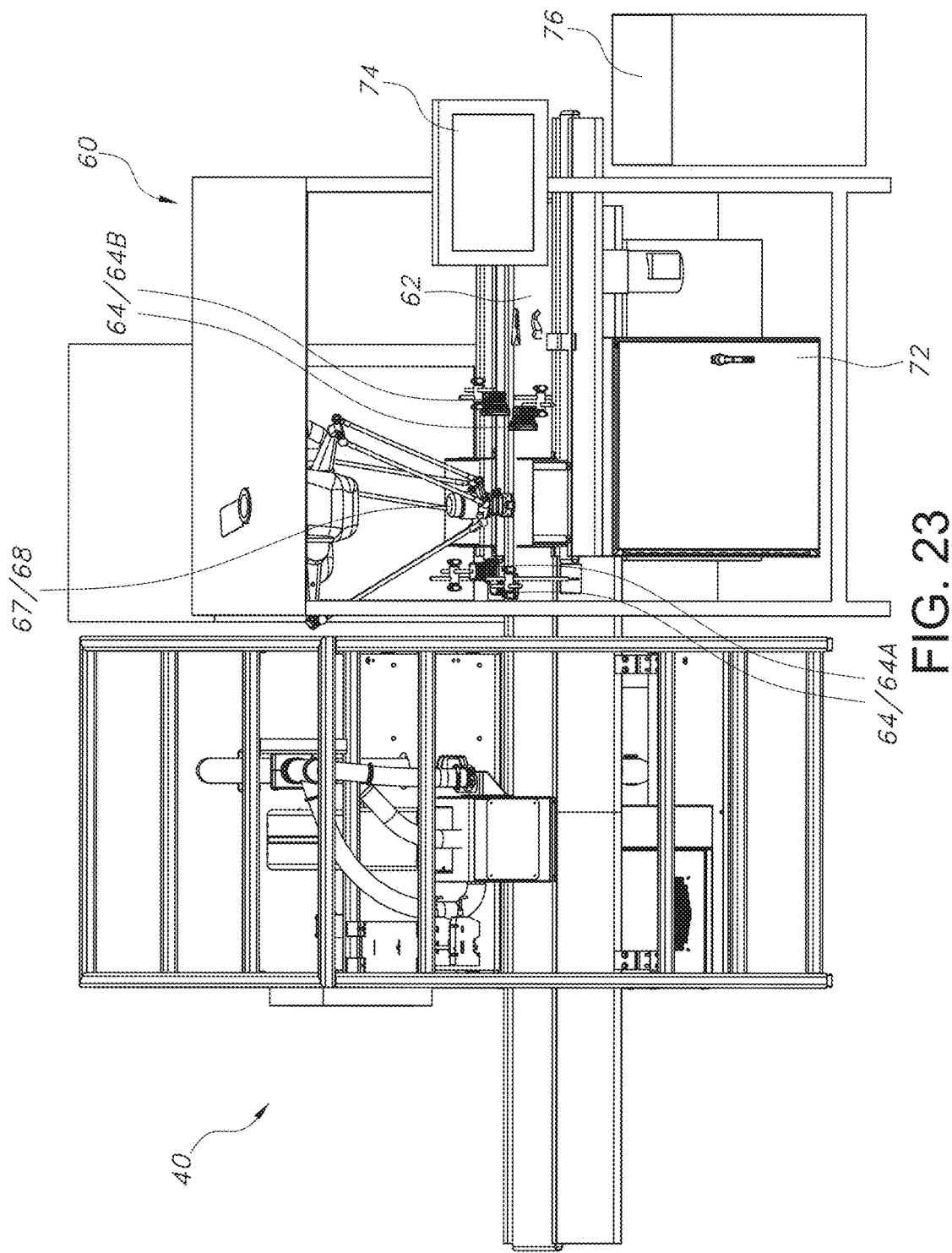
FIG. 23 is a side view of the second embodiment of the cutting station and the extraction station.

FIGS. 14-16, 21 and 23 illustrate the meat extraction station 60, which includes a third conveyor belt 62, a third vision system 64, shown in FIGS. 3 and 4, one or more extraction robots 66, and may include a blower 68. The third conveyor belt 62 may be a separate conveyor belt, particularly when the cutting station 40 uses water knife embodiment and a gripping conveyor, or it may be a continuation of a prior conveyor belt, particularly when the cutting station uses the laser cutting embodiment. As the body part with its cut shell enters the meat extraction station 60, the third vision system 64 identifies the type of body part that is on the conveyor 62 as well as the position and dimensions of the body part. The vision system 64 shown in FIGS. 14-16 is similar to the one used with the butchering system while the vision system 64 illustrated in FIGS. 21 and 23 uses two cameras 64A, 64B per conveyor, one 64A to capture positioning from a vertical direction and the other 64B to capture positioning from a horizontal direction. FIGS. 21 and 23 also illustrates the use of two vision systems 64 and two conveyors 62 to extract a higher volume of meat.

The extraction robot 66 is a programmable vision guided robot, such as a six-axis or delta robot, and uses the information from the vision system 64 to extract the meat. Different methods of extraction may be used depending on the particular body part and the particular type of extraction robot 66. For example, the claw is likely to be cut around its outer edge in which case the robot 66 may simply remove the upper half of the shell and dump the meat onto the conveyor using a conventional end-effector or end of arm tool ("EOAT") 67. Alternatively, the knuckle is likely to be cut on one end, and the robot 66 may pick up the knuckle and position it in front of the blower 68, which uses a burst of air or liquid, such as water, to force the meat out of the shell.

The blower 68 may be attached to the EOAT as shown in FIGS. 22-23 or it may be separately positioned beside the robot 66 as shown in FIGS. 14-16. The embodiment shown in FIGS. 14-16 also includes a first conveyor 62A and second conveyor 62B, where the meat-filled body part enters the station 60 on second conveyor 62B, and the extraction robot 66 places the shelled meat on the first conveyor 62A, and the empty shell is placed, or remains, on the second conveyor 62B.

Also shown in FIG. 23 is a conventional power supply and input/out rack 72 for use with the components of the extraction station 60, a conventional human interface device 74 for controlling and monitoring the extraction station 60, and a waste bin 76 for collecting the empty shells.

Once the meat has been extracted from the shell, the meat continues along the conveyor 62 to the batching station 80, where the meat is packaged. The packages are sent on to the retort station 90 for final conditioning in preparation for sale. For example, the packages are first exposed to heat, to cook the meat, and then are chilled. Automated processes for packaging and preparing the package for sale are known and are not discussed in any detail herein.

It is understood that the embodiments described herein are merely illustrative of the present invention. Variations in the method and processing line may be contemplated by one skilled in the art without limiting the intended scope of the invention herein disclosed and as defined by the following claims.

What is claimed is:

1. A method for cutting a shell on a shellfish, the method comprising the following steps:
    a) providing a conveyor system for transporting the shellfish through a cutting station;
    b) transporting the shellfish through the cutting station, the cutting station being equipped with a laser cutting system that cuts the shell on the shellfish to obtain one or more cut shell parts.

2. The method of claim 1, wherein the laser cutting system includes a laser, and transporting the shellfish through the cutting station includes the following steps:
    b2) transporting the shellfish under the laser; and
    b3) using the laser to cut the shell on the shellfish.

3. The method of claim 2, wherein the laser cutting system includes a scanner that is connected to a controller, the controller also being connected to the laser, and transporting the shellfish through the cutting station includes the following steps:
    b4) transporting the shellfish under the scanner, the scanner capturing the shellfish's position on the conveyor system and the shellfish's dimensions, the scanner transferring the shellfish's position and the shellfish's dimensions to the controller;

b5) the controller being programmed to use the shellfish's position and shellfish's dimensions to generate a cut pattern for the laser.

4. The method of claim 3, wherein the laser cutting system includes a laser beam control device that is connected to the controller, and transporting the one or more severed parts through the cutting station includes the following steps:

b6) using the controller to transmit the cut pattern to the laser beam control device and the laser beam control device guiding a laser beam from the laser around the shellfish's shell.

5. A device adapted to harvest meat from a shellfish the device comprising:

a controller that is connected to a scanner, a laser and a laser beam control device;

wherein the scanner captures image data of the shellfish and transmits the image data to the controller;

wherein the controller creates a cut pattern from the image data and transits the cut pattern to the laser beam control device; and wherein the laser beam control device guides a laser beam emitted from the laser around the shellfish, the laser beam cutting only a shell on the shellfish along the cut pattern.

6. The device of claim 5, further including a conveyor that conveys the shellfish under the scanner and under the laser.

7. The device of claim 6, wherein the scanner is a laser measurement sensor and the image data includes the position of the shellfish on the conveyor and dimensions of the shellfish shell.

8. The device of claim 7, wherein the laser is a carbon dioxide laser.

9. The device of claim 8, wherein the laser beam control device is a 3-axis mirror galvanometer.

10. A method for deshelling shellfish, the method comprising the following steps:

a) providing a conveyor system that automatically transports the shellfish from one station to a next station;

b) transporting the shellfish through a butchering station that has a vision-guided butchering robot and a butchering block, wherein the butchering robot grips the shellfish and places the shellfish into the butchering block to break the shellfish into one or more severed parts, and then places the one or more severed parts back on the conveyor system;

c) transporting the one or more severed parts through a cutting station that is equipped with a laser cutting system for cutting a shell on each of the one or more severed parts to obtain one or more cut shell parts; and d) transporting the one or more cut shell parts through an extraction station and extracting meat from the one or more cut shell parts to obtain extracted meat.

11. The method of claim 10, further comprising a step of:

e) transporting the shellfish initially through a steam station and sanitizing the shellfish.

12. The method of claim 11 further comprising the following step:

f) transporting the extracted meat through a batching station and gathering the extracted meat to a package of shellfish meat.

13. The method of claim 12 further comprising the following step:

g) transporting the package through a retort station to cook and then chill the shellfish meat.

* * * * *